Jan. 28, 1964 W. H. SUTTON 3,119,526
STOCK FEEDING APPARATUS
Filed March 31, 1960 3 Sheets-Sheet 1
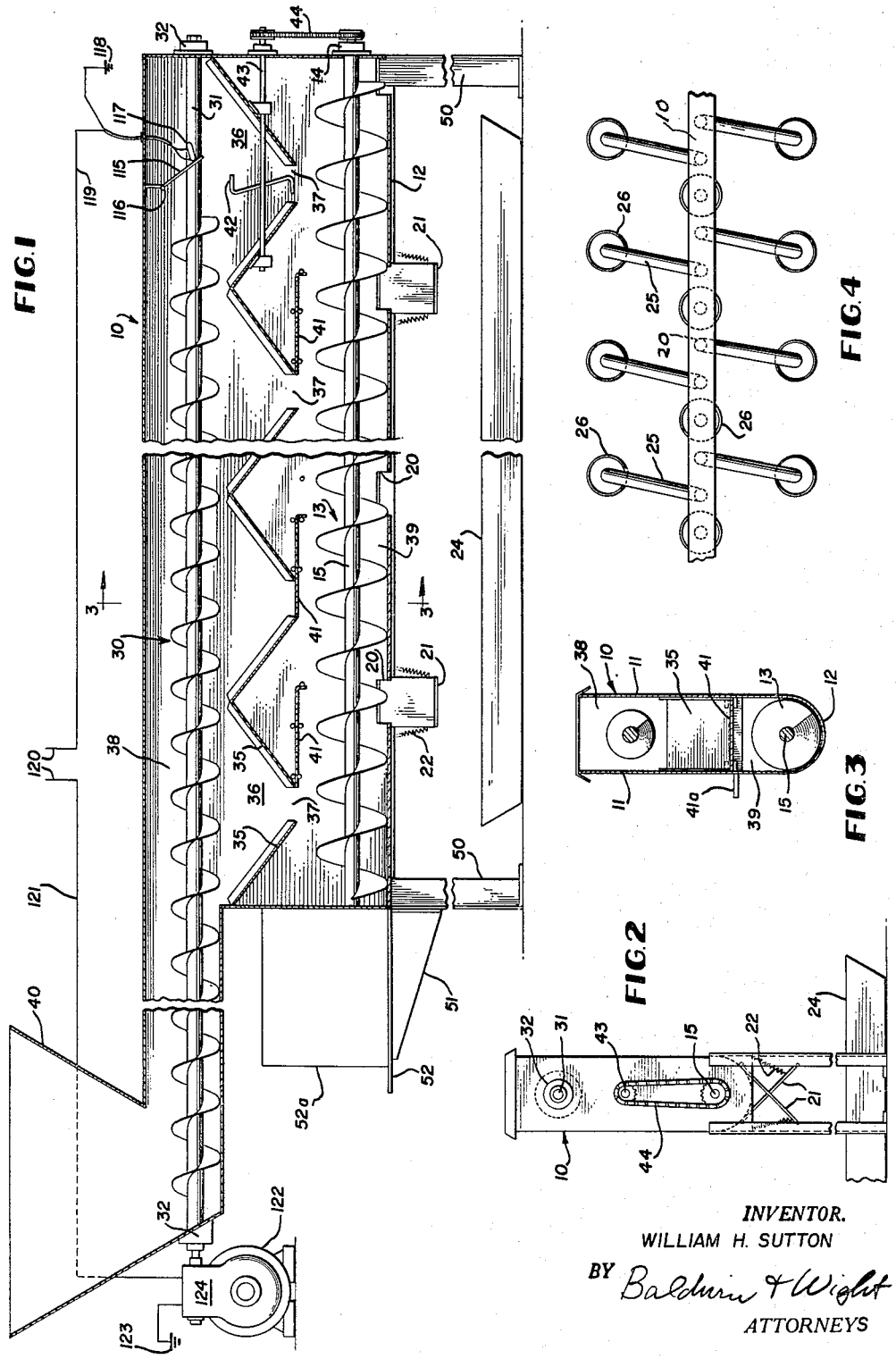
INVENTOR.
WILLIAM H. SUTTON
BY Baldwin & Wight
ATTORNEYS

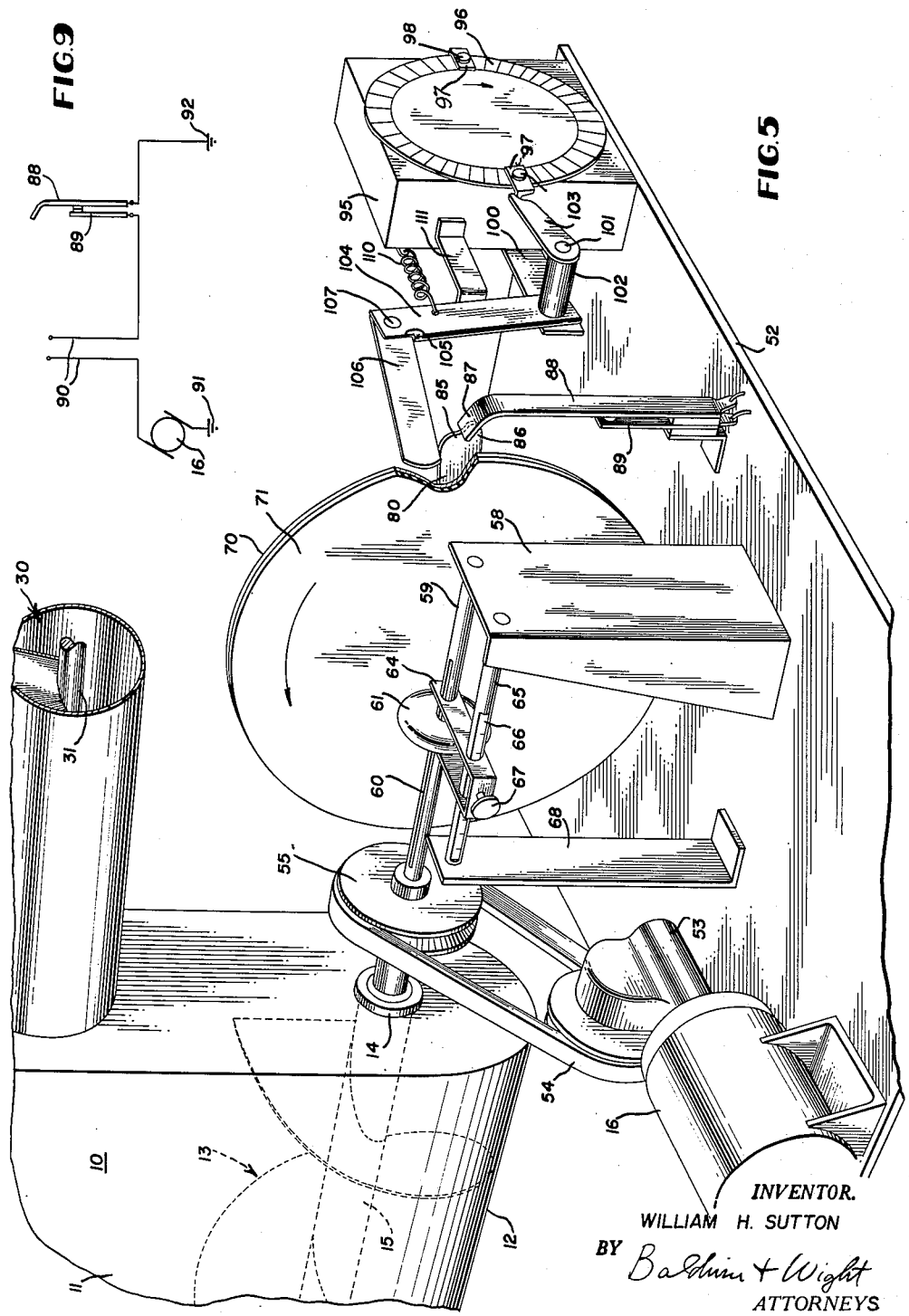

Jan. 28, 1964 W. H. SUTTON 3,119,526
STOCK FEEDING APPARATUS
Filed March 31, 1960 3 Sheets-Sheet 3

INVENTOR.
WILLIAM H. SUTTON
BY Baldwin + Wight
ATTORNEYS

United States Patent Office 3,119,526
Patented Jan. 28, 1964

3,119,526
STOCK FEEDING APPARATUS
William H. Sutton, 707 N. Ave. G, Clifton, Tex.
Filed Mar. 31, 1960, Ser. No. 18,971
5 Claims. (Cl. 222—56)

This invention relates to an apparatus for feeding livestock and poultry.

An important object of the invention is to provide an apparatus for supplying dry feed to troughs, pans or the like from a dispensing mechanism controlled to dispense the food at predetermined time intervals and in predetermined quantities, and to maintain feed in the dispensing mechanism automatically in accordance with the demands thereof so that feed is always available to the dispensing mechanism to be dispensed thereby in the predetermined quantities and at the predetermined time intervals referred to.

A further object is to provide such an apparatus wherein the means for supplying feed to the dispensing mechanism is controlled in accordance with the quantity of feed in such supply means whereby, when a predetermined adequate quantity of feed is present in the supply means, the means for forcing feed thereinto is cut off and is reactivated automatically when the quantity of food in the supply means drops due to the dispensing of feed from the dispensing mechanism.

A further object is to provide a novel mechanism for automatically supplying feed to troughs, pans or the like for the feeding of stock and poultry, wherein a dispensing mechanism is maintained full of feed and dispenses feed into the troughs or pans at predetermined time intervals and in predetermined quantities in accordance with the setting of the operating means for the dispensing mechanism.

A further object is to provide such an apparatus wherein a conveyor is operative for moving feed through a dispensing casing to drop through dispensing openings therein, and to provide a novel automatic drive mechanism for the conveyor so that the latter is caused to dispense a predetermined quantity of feed at any selected time of the day.

A further object is to provide such an apparatus wherein a power source is employed for driving the conveyor to effect the feed dispensing operation, and to provide adjustable means for controlling the power source so that the latter operates to control the amount of feed dropped at each conveyor operation.

A further object is to provide an apparatus of this character including a variable speed drive between the power source and a controlling mechanism so that the setting of the variable speed drive will determine the extent of operation of the conveyor and thus determine the quantity of food dropped during each dispensing operation.

A further object is to provide a dispensing mechanism of the character referred to, in combination with a supply source which functions automatically in accordance with the demands of the dispensing mechanism to maintain the latter always charged with feed, ready for each dispensing operation.

A further object is to provide such a combination wherein the supply source is in the form of a casing adjacent and parallel to the dispensing mechanism for supplying feed to the latter by gravity, the supply source comprising means for conveying feed throughout the length of the apparatus, and to provide automatic means for cutting off the operation of the supply conveying means when the supply source is full of feed and for automatically starting the conveying means when the supply of feed in the supply source drops incident to operation of the dispensing mechanism.

A further object is to provide a combination of the character referred to wherein the supply source and dispensing mechanism commonly include an elongated casing structure having supply hoppers between the supply source and the dispensing mechanism for dropping food from the former to the latter, and wherein feed is supplied to the supply source from one end thereof and conveyed therethrough in any suitable manner, and wherein the other end of the supply source is provided with a switch operative by the feed itself for predetermining the maintenance of feed in the supply source.

Other objects and advantages of the invention will become apparent during the course of the following description.

In the drawings I have shown one embodiment of the invention. In this showing:

FIGURE 1 is a vertical longitudinal sectional view through the apparatus, parts being shown in elevation;

FIGURE 2 is an end elevation, partly broken away, of the right-hand end of the mechanism shown in FIGURE 1;

FIGURE 3 is a detail vertical sectional view on line 3—3 of FIGURE 1;

FIGURE 4 is a reduced fragmentary plan view of a modified form of mechanism employing feed pans instead of the trough shown in FIGURE 1;

FIGURE 5 is a fragmentary perspective view of parts of the mechanism particularly illustrating the driving and control means for the dispensing mechanism, the parts being shown at rest in the positions they occupy just after a feeding operation has been completed;

Figures 6, 7, 8:
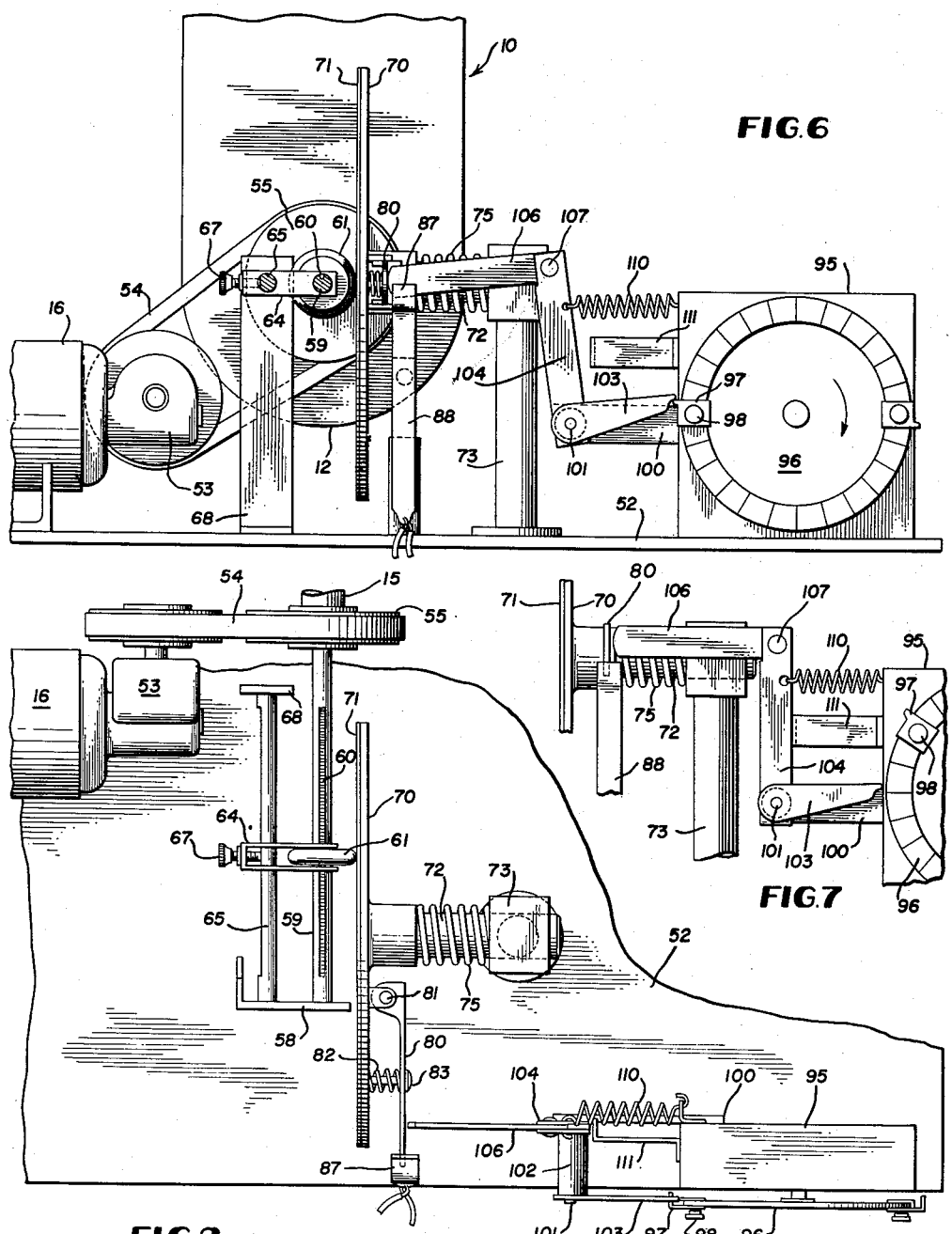
FIGURE 6 is an elevation of the same, looking from the left-hand end of the apparatus in FIGURE 1, showing the parts in the positions they occupy at the instant a time controlled device has been operated to start a feeding operation of the dispensing mechanism conveyor.
FIGURE 7 is a fragmentary elevation of a portion of the control mechanism in FIGURE 5 but with the parts in positions occupied shortly after a feeding operation has been concluded.

FIGURE 8 is a plan view of the mechanism in FIGURE 6, but showing certain control mechanism parts in the positions shown in FIGURE 7, but showing a timing trigger in a position of approach to a timing arm, rather than moving away from the timing arm, as in FIGURE 7; and FIGURE 9 is a diagram of an electrical system which may be employed for controlling the motor which drives the dispensing mechanism.

Referring to FIGURE 1, the numeral 10 designates an elongated casing as a whole which houses the supply and dispensing mechanism of the apparatus, and this casing may be of any desired length, as will become apparent. The casing structure includes side walls 11 (FIGURE 3), the lower ends of which are joined in a semicircular bottom 12 in which is arranged an auger or spiral conveyor 13 journaled in suitable bearings 14, one of which is shown in FIGURE 1. The auger 13 includes the usual drive shaft 15, one end of which is driven in a manner to be described by an electric motor 16 (FIGURE 5).

In a manner to be described, a supply of feed is maintained in the lower part of the casing 10 to be moved to the right by operation of the auger 13 to be dropped through any suitable number of horizontally deployed outlet openings 20, some or all of which may be provided with dispersing plates 21 (FIGURES 1 and 2) preferably having their lower ends spring-supported as at 22. These dispersing plates 21 may be employed for scattering the feed across a feed trough 24, when a feeding unit of this type is employed. If desired, as shown in FIGURE 4, where poultry is to be fed, the openings 20 may supply the feed through dispensing tubes 25 to feed pans 26, some of which may be arranged directly beneath the casing 12 as shown in FIGURE 4 so that the feed drops directly thereinto.

In the top portion of the casing 10 is arranged a second conveyor 30, preferably in the form of an auger as shown, and it will be apparent that within the scope of the present invention either or both conveyors 13 and 30 may be of types different from the one illustrated. The auger 30 includes a drive shaft 31 supported in any suitable type of bearings 32.

Between the two conveying devices, the side walls 11 are connected by alternately sloping plates 35 forming hoppers 36 having bottom openings 37. The plates 35 in effect divide the casing to form an upper supply chamber 38 and a lower dispensing chamber 39. The feed drops by gravity from the supply chamber 38 to the supply chamber 39 through the openings 37.

Feed is supplied at a filling station, represented by a hopper 40, which may, as shown, be at one end of the chamber 38. The bottom openings 37 are at locations spaced horizontally from the filling station. Each of the openings 37, except the opening at the right-hand end of the apparatus, is preferably provided with a slidable control door 41 operative externally of the apparatus by a handle 41ª to close any desired opening or openings 37. The free flow of feed between the chambers 38 and 39 at the right-hand end of the apparatus must be maintained for a reason to be described. Within the hopper 36 at the right-hand end of the apparatus is an agitator 42 mounted on a shaft 43 having a sprocket and chain connection 44 with the adjacent end of the auger shaft 15. Whenever the conveyor 13 is in operation, the agitator 42 will be operated to insure the flow of feed downwardly through the right-hand hopper opening 37 from the supply chamber 38 if the dispensing chamber 39 is free to receive such supply.

The casing 10 is supported in any suitable manner above the ground or floor. For example, it may be suspended from the roof or ceiling of a building or it may be suitably mounted on supporting legs 50. Connected to the legs 50 at one end of the apparatus are brackets 51 supporting a platform 52 on which is arranged a housing 52ª for the operating and control mechanism for the conveyor 13. This mechanism is shown in detail in FIGURES 5–8, inclusive. The motor 16 is mounted on the platform 52 and, through a suitable reduction gearing 53, drives a belt 54 passing around a pulley 55 on the shaft 15 externally of the adjacent end of the casing 10. Of course, any suitable power transmitting means may be connected between the motor 16 and the conveyor shaft 15.

Mounted on the platform 52 is a vertical support 58 in which is journaled one end of a reduced shaft 59 fixed coaxially to and extending from the shaft 15 and provided with a spline groove 60. A friction drive wheel 61 is splined on the shaft 59 through the medium of the groove 60. Accordingly, the wheel 61 is positively driven by the shaft 59 but is slidable along the shaft. The wheel 61 is mounted between the arms of a yoke 64 slidable along a guide shaft 65. The guide shaft has its side opposite the shaft 59 flattened as at 66 and calibrated for a purpose to be explained later. A thumb screw 67, carried by the yoke 64, is adapted to secure the yoke in adjusted position along the shaft 65. The ends of the shaft 65 are respectively supported by a bracket 68 and the support 58.

The friction wheel 61 is engageable against a driven disk 70 having a rubber or similar facing 71 engageable with the drive wheel 61. The disk 70 is rotatable on a fixed shaft 72 secured to the upper end of a standard 73 mounted on the platform 52. A compression spring 75 is mounted between the disk 70 and the standard 73 to bias the disk 70 into engagement with the drive wheel 61.

A cam arm 80 is pivoted as at 81 to the back face of the disk 70. The cam arm 80 normally occupies the position relative to the disk 70 shown in FIGURE 8 and is urged to this position by a spring 82. This spring surrounds a stud 83 carried by the disk 70, the head of the stud limiting movement of the cam arm 80 to its normal position.

The free end of the cam arm 80 extends radially beyond the disk 70, the top portion of the cam arm terminating in a cam end 85 beneath which the cam arm is provided with a projecting finger 86. Rotation of the disk 70 in the direction of the arrow in FIGURE 5 moves the cam end 85 into engagement with a finger 87 carried by the upper end of a resilient switch arm 88 cooperable with a switch arm 89. The arm 88 is biased toward the arm 89 to close a circuit for the motor 16 as shown in FIGURE 9. Line wires 90 from a source of current are connected respectively to the switch arm 89 and to one terminal of the motor 16, the other terminal of the motor being grounded as at 91. The switch arm 88 is grounded as at 92. Whenever the switch arm 88 is released in the manner to be described, the motor 16 will operate, and feed will be moved through the chamber 39 by the conveyor 13. Whenever the rotation of the disk 70 moves the end of the cam arm 80 into engagement with the finger 87, the circuit through the motor 16 will be broken. The conveyor 13 will be stopped in response to operation of the conveyor, the drive wheel 61, and the disk 70 a predetermined amount irrespective of the conveyor speed.

The closing of the circuit for the motor 16 is controlled by a clock-operated mechanism. This mechanism comprises a casing 95 housing any suitable type of clock mechanism (not shown) operatively connected to a dial 96 which preferably rotates once in twenty-four hours, and is calibrated to indicate each hour. The dial 96 is provided with one or more triggers 97 secured in selected positions around the dial 96 by thumb screws 98, depending upon the time of feeding of the stock or poultry.

Against the rear face of the casing 95 is secured a bracket arm 100 supporting a shaft 101 on which is journaled a sleeve 102. One end of this sleeve is fixed to an arm 103, the free end of which is arranged in the path of travel of the trigger or triggers 97. To the other end of the sleeve 102 is fixed a bifurcated arm 104, the upper end of which is slotted as at 105 for the mounting of a cam operating arm 106 pivoted as at 107 to the arm 104.

The arms 103 and 104 and the sleeve 102 constitute a bell-crank lever adapted to be rocked counterclockwise about the axis of the shaft 101 by engagement of the arm 103 with one of the triggers 97. A spring 110 is connected between the arm 104 and the casing 95 to bias the arm 104 to a normal vertical position as shown in FIGURES 5 and 7. Movement of the arm 104 to this position is limited by engagement of the arm with a bracket 111 fixed to the casing 95. When the arm 104 is in vertical position, the arm 106 is in horizontal position, the arm 106 being prevented from dropping below horizontal position by the bottom of the slot 105, while the arm 106 is freely movable upwardly in a manner to be described.

Operation of the conveyor 13, through the mechanism just described, is controlled on a quantity of feed basis at selected times, while the conveyor 30 is controlled on the basis of the demands of the dispensing conveyor 13. When additional feed is needed in the dispensing chamber 39, the conveyor 30 automatically comes into operation. To this end, a preferably forked plate 115, straddling the shaft 31, is arranged near the end of the shaft 31 remote from the hopper 40. The plate 115 is pivotally supported by the top of the casing 10 as at 116. A closed-when-level mercury switch 117 or the like is mounted on the pivoted plate 115, and has one terminal grounded as at 118 and its other terminal connected by a wire 119 to one of a pair of line wires 120. The second line wire is connected as at 121 to one terminal of a motor 122 having its other terminal grounded as at 123. The motor 122 is preferably provided with a reducing gearing 124 to drive the conveyor 30 at the desired speed.

When feed passes downwardly through the openings 37 in the course of a normal feed dispensing operation, the pivoted plate 115 is free to swing to a relaxed position, which levels the mercury switch 117 and closes the circuit for the motor 122, causing the latter to drive the conveyor 30 until the material fed along and within the chamber 38 pushes against and swings the plate 115 counterclockwise, thus opening the switch 117.

*Operation*

The hopper 40 may be of any desired size to maintain in itself and in the chamber 38 the amount of feed required for any desired time period. With the hopper loaded, the motor 122 operates the conveyor 30 to move the material to the right in FIGURE 1 along the chamber 38. The switch arm 115 is normally swung downwardly from the position shown in FIGURE 1 and the switch 117 is biased to closed position, and accordingly the motor will operate upon the closing of a master switch (not shown) in the circuit of the motor.

As feed is moved through the chamber 38, the successive hoppers 36 will be filled, and the feed will drop by gravity through the openings 37 into the chamber 39. When the chambers 38 and 39 and hoppers 36 are all filled with feed so that no more feed can flow downwardly into the dispensing chamber 39, the feed accumulating near the right-hand end of the conveyor 30 in FIGURE 1 will swing the switch arm 115 and switch 117 to open the circuit of the motor 122.

The operation of the motor 16 drives the dispensing conveyor 13. When the motor 16 is operating, feed will be moved from each opening 37, which has its gate 41 open, and will be moved to the right in FIGURE 1 to the next adjacent discharge opening 20. The longitudinal offsetting of each opening 20 from the preceding opening 37 prevents feed from falling directly from the hoppers 36 through the openings 20, the dropping of feed through the openings 20 stopping as soon as the circuit to the motor 16 is opened in a manner to be described, and the conveyor 13 is consequently stopped.

When the arm 115 has opened the switch 117 and feed is dispensed from the chamber 39 by operation of the conveyor 13, the level of the supply of feed in the chamber 38 will drop. The agitator 42 assures the flowing of feed downwardly through the opening 37 at the right-hand end of the machine, and when the level of the feed in the chamber 38 drops, the switch arm 115 is free to drop to start the motor 122 and replenish the supply of feed in the chamber 38.

The operation of the dispensing conveyor drive motor 16 is controlled by the mechanism shown in FIGURES 5–8, inclusive. As hereinafter explained, the disk 70 performs one revolution for each feeding period. The shaft 15 is normally driven at a constant speed when the motor 16 is operative, thus effecting the dispensing of feed through the openings 20 at a fixed rate. The number of degrees of revolution through which the wheel 61 will turn during each operation depends upon the position of the friction drive wheel 61 with respect to the center of the disk 70. Obviously, the closer the contact point between the wheel 61 and disk 70 is to the center of the disk 70, the fewer the degrees of revolution of the wheel 61 needed for the required rotation of the disk 70. Conversely, by loosening the thumb screw 67 and sliding the drive wheel 61 away from the center of the disk 70, the greater will be the number of degrees of revolution of the wheel 61 required during the feeding cycle. The required number of degrees of revolution of the wheel 61 may be determined by the calibrations on the flat surface 66 on the shaft 65.

FIGURE 7 shows the positions of parts of the dispensing apparatus control mechanism and the timing mechanism a considerable period of time after the completion of a feeding operation with all of the parts, except the timing dial 96 and trigger 97, at rest. The trigger 97, having passed beyond the arm 103, the bell crank 102, 103, 104 will have been retracted by the spring 110, and the pusher arm 106 will be disposed substantially horizontally and just out of contact with the cam arm 80 which is engaging the switch arm 88 and holding the latter in open position out of contact with the switch arm 89. Consequently, the circuit for the dispensing mechanism motor 16 will be open and the conveyor 13 will not be operating.

As the timing dial 96 continues to rotate, the trigger 97 disposed at 180° from the trigger shown in FIGURE 7 will move up under the arm 103 as shown in FIGURE 8, eventually engaging the arm 103 as shown in FIGURE 6 and rocking the bell crank 102, 103, 104 to push the arm 106 forwardly as shown in FIGURE 6, thus rocking the cam arm 80 about its pivot 81 and displacing the end 85 of the cam arm from the end 87 of the switch arm 88. This will enable the switch arm 88 to move, by its own resilience, to closed position in contact with the switch arm 89, thereby energizing the circuit for the motor 16 and causing the dispensing conveyor 13 to be driven and feed to be dispensed through the openings 20.

While the conveyor 13 is being driven, the disk 70 is driven by the wheel 61, and the cam arm 80 will move beyond the pusher arm 106. However, the timing dial 96 turns so slowly as compared to the speed of rotation of the disk 70 that the trigger 97 will remain in engagement with the bell crank arm 103 throughout a complete feeding cycle, i.e. a complete rotation of the disk 70. When the disk 70 has made a complete cyclic rotation, the cam arm 80 on the disk will move up under the pusher arm 106 and lift the latter to the position shown in FIGURE 5, as is permitted by the pivotal connection 107, the trigger 97 still being in engagement with the bell crank arm 103 as shown in FIGURE 5 due to the slow speed of rotation of the timing dial 96. When the cam arm 80 moves to the position shown in FIGURE 5, its end 85 engages the top 87 of the switch arm 88 to open the switch and interrupt the circuit for the motor 16. Engagement of the finger 86 on the arm 80 with the top or finger 87 of the switch arm 88 produces a braking effect preventing overrunning of the disk 70. The switch 88, 89 having thus been opened, the feeding operation will stop after dispensing of a predetermined quantity of feed through the openings 20.

The timing dial 96 will continue to rotate slowly until the trigger 97, shown in FIGURE 5 as engaging the bell crank arm 103, moves out of engagement with the arm 103 toward the position shown in FIGURE 7, thus permitting the spring 110 to rock the bell crank and retract the pusher arm 106 to the position shown in FIGURE 7. The parts, other than the trigger 97 and dial 96, will remain in these positions of rest until the other trigger 97, spaced 180° from the trigger shown in FIGURE 7, engages the arm 103 to rock the bell crank again and start another feeding operation.

The clock mechanism is shown as being provided with two triggers 97 arranged approximately twelve hours apart. It will be apparent, however, that a single trigger 97 may be employed for one feeding every twenty-four hours, or two or more triggers may be used for two or more daily feedings of the stock or poultry.

The operation of the dispensing conveyor 13, as previously stated, is rotationally controlled, the dispensing operation being stopped and started by the mechanism just described. Each operation of the dispensing mechanism, and hence the quantity of feed dropped during each cyclic operation, depends upon the transmission driving ratio between the friction wheel 61 and disk 70. Hence at each dispensing operation, the desired amount of feed may be dropped into the trough 24 (FIGURE 1) or through the tubes 25 and into the trays 26 (FIGURE 4).

The operation of the supply conveyor 30 is dependent upon the demands of the dispensing conveyor. Whenever there is a drop in the level of the feed in the right-hand end of the supply chamber 38 (FIGURE 1), the switch 117 will be automatically closed until the supply chamber is again filled at which time the movement of the feed will open the switch 117.

From the foregoing it will be apparent that the apparatus requires no attention after being put into operation except for the maintenance of feed in the hopper 40 in order to maintain in the chamber 38 at all times an adequate amount of feed to supply the demands of the dispensing mechanism. It also will be apparent that the present invention involves the method of dispensing feed at predetermined time intervals, and together with the step of maintaining adequate feed for dispensing in accordance with the dropping of the feed level by the dispensing mechanism. The apparatus requires no attention except for keeping an adequate supply of feed in the hopper 40.

The construction and operating procedure shown and described are preferred, but it is intended that the disclosure be illustrative rather than definitive, the invention being defined in the claims.

I claim:

1. A stock feeding mechanism comprising a casing having a lower dispensing chamber and an upper supply chamber, means dividing said chambers therebetween and providing spaced openings for the gravity movement of feed from said supply chamber to said dispensing chamber, a conveyor for moving feed through said dispensing chamber from one end toward the other end thereof, said dispensing chamber having a dispensing opening in the bottom thereof offset from each of said first named openings in the direction of said other end of said casing, means for initiating operation of said conveyor at time intervals, means for stopping operation of said conveyor in response to a predetermined amount of conveying movement thereof irrespective of the conveyor speed, and means for maintaining feed in said supply chamber in accordance with the demands of said dispensing chamber.

2. A stock feeding mechanism comprising a horizontal elongated casing having in the bottom thereof an elongated dispensing chamber the bottom of which is provided with longitudinally spaced dispensing openings, a conveyor extending longitudinally through said dispensing chamber and operative for moving feed therein from one end of said casing toward the other end thereof, means for supplying feed to said dispensing chamber at spaced points each offset from one of said dispensing openings toward said one end of said casing, an electric motor connected to drive said conveyor, a rotatable control member having a cam arm spaced therefrom in a normal position and movable toward said rotatable member, a circuit for said motor including a switch having an arm arranged with a portion in the path of rotational travel of said cam arm and normally engaged therewith to maintain said switch open, variable speed ratio drive means between said motor and said rotatable member to predetermine the ratio of rotation of said rotatable member relative to the rotation of operation of said conveyor, and a control mechanism comprising a clock mechanism operative at a predetermined time for moving said cam arm toward said rotatable member to release said switch arm to close said switch to energize said motor to operate said conveyor and to rotate said rotatable member through one complete rotation.

3. A mechanism according to claim 2 wherein said variable ratio drive means comprises a shaft connected to be driven by said motor and having a spline groove, and a friction wheel on such shaft splined in said groove and movable to adjusted positions therealong, said rotatable member comprising a friction disk engaging the periphery of said friction wheel.

4. A mechanism according to claim 2 wherein said control mechanism comprises a trigger carried and movable by said clock mechanism, and mechanical means between said trigger and said cam arm, said mechanical means comprising an arm operative by said trigger and engageable with said cam arm to move it out of engagement with said switch arm.

5. A stock feeding mechanism comprising a casing having a lower dispensing chamber and an upper supply chamber; means dividing said chambers therebetween and providing spaced openings for the gravity movement of feed from said supply chamber to said dispensing chamber; a conveyor for moving feed through said dispensing chamber from one end toward the other end thereof, said dispensing chamber having a dispensing opening in the bottom thereof offset from each of said first named openings in the direction of said other end of said casing; an electric motor; transmission means connecting said motor to said conveyor; a circuit for said motor including a switch; control means connected to said transmission means to be driven thereby through successive cyclic operations and normally holding said switch open, said control means comprising a rotatable disk having a cam arm normally engaging said switch to maintain it open, and adjustable ratio drive means between said transmission means and said disk for predetermining the extent of operation of each said cycle; and time-controlled means having an element engageable with said cam arm to release it from said switch for periodically causing said control means to release said switch for movement to closed position to energize said motor and to effect operation of said control means through one cycle of operation.

References Cited in the file of this patent

UNITED STATES PATENTS

| | | |
|---|---|---|
| 2,014,617 | Fischer | Sept. 17, 1935 |
| 2,276,382 | Francis | Mar. 17, 1942 |
| 2,674,396 | Peterson | Apr. 6, 1954 |
| 2,794,576 | Reynolds | June 4, 1957 |
| 2,801,610 | Wallace et al. | Aug. 6, 1957 |
| 2,929,356 | Bacigalupo | Mar. 22, 1960 |
| 3,001,672 | Wahl | Sept. 26, 1961 |